United States Patent [19]
Kopera, Jr.

[11] 3,858,175
[45] Dec. 31, 1974

[54] MOTOR VEHICLE ELECTRONIC SECURITY ALARM SYSTEM USING SEQUENCE CONTROL ARMING

[75] Inventor: Joseph J. Kopera, Jr., Trenton, Mich.

[73] Assignee: Chrysler Corporation, Highland Park, Mich.

[22] Filed: Sept. 8, 1972

[21] Appl. No.: 287,401

[52] U.S. Cl. ............... 340/63, 180/114, 307/10 AT, 340/223, 340/274
[51] Int. Cl. ..................... B60n 25/10, G08b 13/08
[58] Field of Search ....... 340/63, 64, 223, 274, 276; 307/10 AT; 180/114

[56] References Cited
UNITED STATES PATENTS

| | | | |
|---|---|---|---|
| 3,449,738 | 6/1969 | Chesnul et al. | 340/274 |
| 3,541,505 | 11/1970 | Lee | 180/114 |
| 3,585,584 | 6/1971 | Behrend | 340/276 |
| 3,611,287 | 10/1971 | Hoff et al. | 340/63 |
| 3,634,846 | 1/1972 | Fogiel | 340/274 |
| 3,710,316 | 1/1973 | Kromer | 340/63 |
| 3,710,317 | 1/1973 | Colsen et al. | 340/64 |

Primary Examiner—Donald J. Yusko
Assistant Examiner—Joseph E. Nowicki
Attorney, Agent, or Firm—Talburtt & Baldwin

[57] ABSTRACT

A security alarm system for motor vehicle wherein in response to an unauthorized entry into the vehicle or the opening of the hood or the trunk, an alarm comprising the exterior lights and the horn is energized. The system provides means for arming the system by a vehicle occupant turning a key in either of the front door locks. If one of the switch means responsive to either the doors, hood or trunk is actuated to indicate that said door, hood or trunk is open when the system is being armed, the system will not energize the alarm due to that violation until the switch means is subsequently reactuated. Additionally, the system provides for a distress actuator located within the vehicle and accessible to an occupant. Whenever the occupant is faced with a danger, he may actuate the distress switch thereby instantly securing the vehicle and sounding the alarm.

2 Claims, 5 Drawing Figures

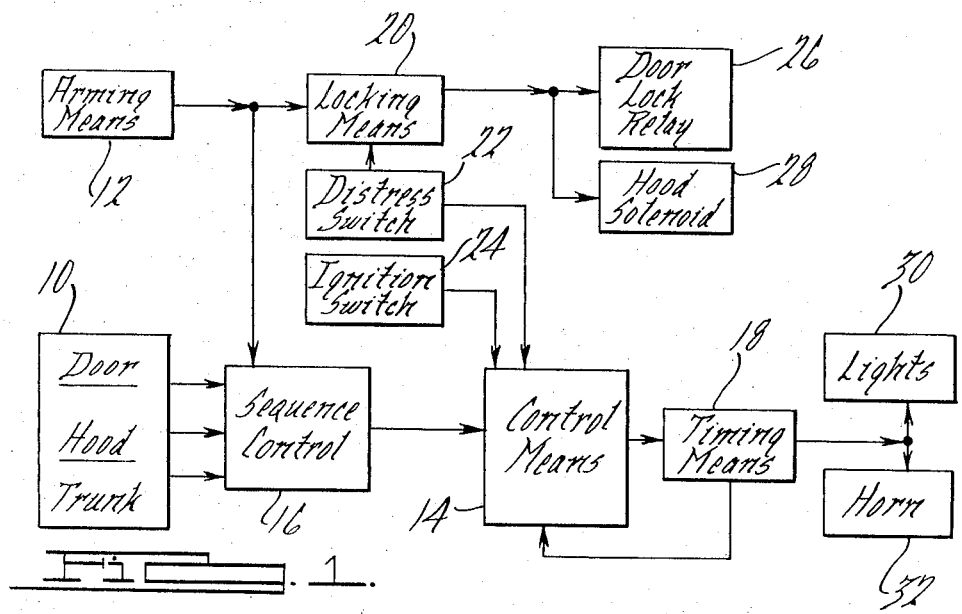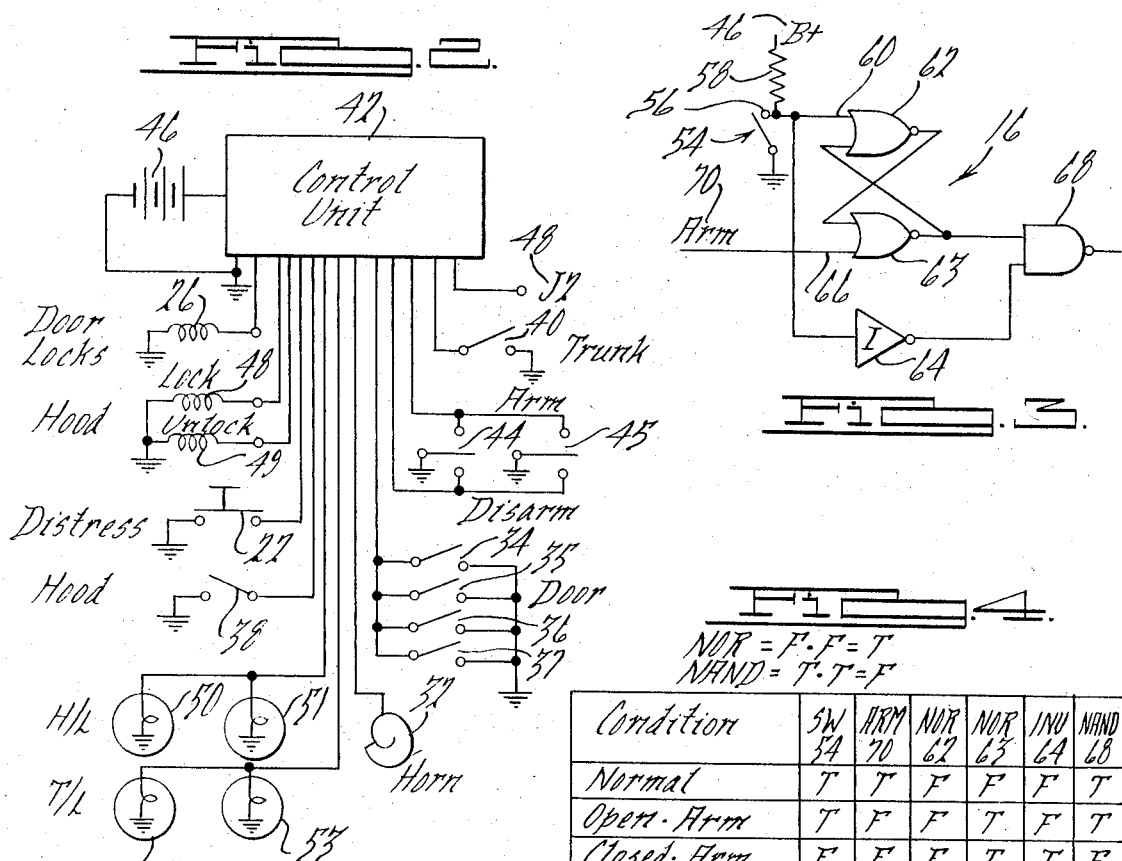

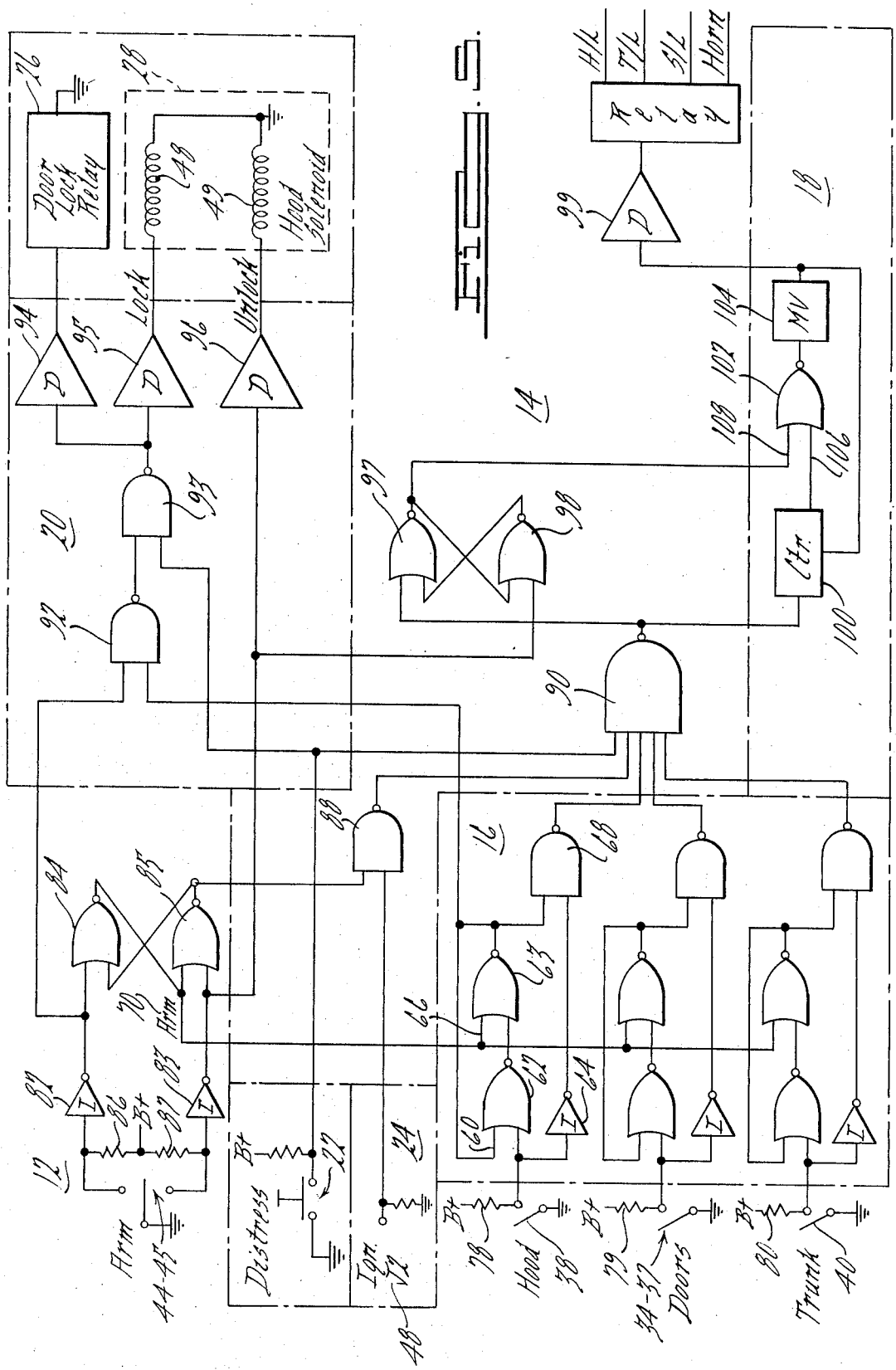

MOTOR VEHICLE ELECTRONIC SECURITY ALARM SYSTEM USING SEQUENCE CONTROL ARMING

FIELD OF INVENTION

This invention relates to security systems in general and particularly to motor vehicle security alarms having sequence controlled arming.

SUMMARY OF INVENTION

It is a principal object of the invention to permit the driver of the vehicle to arm the security system without waiting until all the compartment doors are closed.

It is another object of the invention to provide an occupant distress alarm switch for enabling the occupant to instantly lock all doors and energize the alarm from inside the vehicle.

It is yet another object of the invention to maintain energization of the alarm for consecutive predetermined periods of time until the violation is corrected.

It is a further object of the invention to incorporate the security alarm system in the basic electrical wiring system thereby providing inaccessibility of the system wiring to one contemplating violation of the vehicle passenger, trunk or engine compartments.

These and other objects will become apparent from the following drawings, specification and claims of an improvement in motor vehicle security alarm systems. The motor vehicle alarm system has a switch at each compartment opening normally in a first position indicating that the compartment opening is closed. Each of the switches is actuated to a second position when the corresponding door, hood or trunk compartment is opened. An arming means located in the key-actuated doors is responsive to the actuation of a key for arming the system. A control unit responsive to both the arming means and the second position of any of the switch means provides the electrical signals necessary for pulsating the exterior lights and horn of the vehicle for a predetermined period of time. The improvement to this system comprises a sequence control means, fabricated by complementary metallic oxide semiconductor techniques, C/MOS, for each vehicle compartment. The sequence control means is responsive to the arming means and the second position of any of said switch means for delaying the response of that compartment means to the security alarm system until said one switch means is returned to its first position.

DESCRIPTION OF THE DRAWINGS

In the drawings:

FIG. 1 is a block schematic of the motor vehicle electronic security alarm system;

FIG. 2 is a diagram illustrating the outputs of the control unit of the system;

FIG. 3 is a schematic of the sequence control circuit;

FIG. 4 is a signal table of the schematic of FIG. 3;

FIG. 5 is a schematic of the electronic security alarm system.

DETAILED DESCRIPTION

Referring to the figures by the characters of reference, there is illustrated in FIG. 1 a block diagram of the overall electronic security system of the present invention.

The system comprises a switch means 10 located at each door, hood and trunk, system arming means 12, control means 14 including the sequence control 16 and a timing means 18, locking means 20 and a distress switch 22. The several inputs and outputs to the electronic security alarm system are the ignition switch 24, the door lock relay 26, the hood locking solenoid 28, the exterior lights 30 and the horn 32. As will hereinafter be shown, once the electronic security alarm system is armed by the arming means 12, any violation of the door, hood or trunk compartments as sensed by the switch means 10 will flash the exterior lights 30, including the headlights, the taillights and the side marker lights and beep the horn 32. In addition, the operation of the distress switch 22 for protecting those inside the vehicle will be described.

Referring to FIG. 2, there is a schematic illustrating the forms of the several input and output elements of the system of FIG. 1 as used in the preferred embodiment. The switch means 10 of FIG. 1 as illustrated in FIG. 2 has a plurality of normally open switches including one for each door 34–37, a hood switch 38 and a trunk switch 40. Each of these switches are illustrated as normally open switches which when closed will supply a ground signal to the control unit 42. The door switches 34–37 are electrically connected in parallel therefore not limiting the operation of the system by the number of doors on the vehicle. The normal or first position of the door, hood and trunk switches is an open position when the associated door, hood or trunk is closed. The switches are actuated to a second position when either one of the associated doors, hood or trunk are opened.

The arming means 12 is illustrated in FIG. 2 as a pair of parallel switches 44 and 45. In the preferred embodiment each switch is associated with one of the key activated door locks which are typically found in the right and left front doors of the vehicle. When the key is inserted in the lock and is turned in one direction to manually lock the door, the system is armed and when the key is turned in the opposite direction to manually unlock the door, the system is disarmed. Each of the switches 44 and 45 are normally open and are closed in response to the actuation of a key. Either switch 44 or 45 will operate to disarm the system regardless of which switch was used to arm the system.

The control unit 42 comprises the control means 14, the sequence control 16, the timing means 18 and several other circuits associated with the electronic security alarm system. The control unit 42 is mounted on the vehicle in a somewhat inaccessible place receiving electric power from the motor vehicle battery 46. The circuitry and logic contained within the control unit 42 are typically formed and fabricated by complementary metallic oxide semiconductor techniques, C/MOS, thereby providing a control unit that is relatively insensitive to the extreme temperature conditions which a motor vehicle is subjected and additionally has a low power drain from the battery 46.

The distress switch 22 is illustrated in FIG. 2 as a normally open push-button switch electrically connecting ground to the control unit 42 when the switch 22 is closed. In the preferred embodiment, the distress switch 22 is located on the instrument panel in the passenger compartment. In this position the driver or any passenger of the vehicle can instantly establish a condition of maximum security to the vehicle by activating the electronic security alarm system. As will be described, the function of the security alarm system is to announce unauthorized entry into the motor vehicle and to provide the occupants of the vehicle means for sounding an alarm in case of personal danger or distress to themselves.

The ignition switch 24 is illustrated in FIG. 2 as a connection from the J2 position 28 of the ignition switch. The J2 position is typically the run position of the ignition switch. A voltage signal is present on this position whenever the ignition switch has been turned to either the start or the run position of the motor vehicle.

The door locking relay 26 operates the locking solenoid at each one of the doors to the passenger compartment. If the electronic security alarm system is on a four-door vehicle then in FIG. 2 there would be four locking solenoids. As is well known, the function of the door locking solenoids is to electrically lock the doors upon the actuation of a switch and that once electrically locked, the only way to unlock all doors is to pull the locking push button inside the car as a key will only unlock the door in which it is inserted.

The hood locking solenoid 28 in FIG. 1 is represented by a lock coil 48 and an unlock coil 49. When the hood is closed the lock coil 48 will actuate a locking member for lockingly engaging the hood latch preventing the hood from being unlocked and opened. The unlock coil 49 functions to electrically remove the locking member from the hood latch thereby allowing the hood to be opened by authorized individuals.

The lights 30 of FIG. 1 are illustrated in FIG. 2 as a pair of headlights 50 and 51 and a pair of taillights 52 and 53. If the motor vehicle has the typical sidelights which are on the side of the vehicle adjacent to the headlights and the taillights, these lights are also electrically connected to control unit 42.

The horn 32 is also illustrated in FIG. 2 as being connected to control unit 42. As will hereinafter be shown, the lights 50-53 and the horn 32 will be energized by a pulsating electric current at a predetermined pulsating rate. In the preferred embodiment this rate is approximately 100 cycles per minute. It is by this means that the unauthorized entry or violation of the several compartments of the vehicle are announced. Likewise in the event that the distress switch 22 has been actuated, the lights and horn will likewise announce or call attention to the fact that there is something wrong at the vehicle.

A portion of the sequence control 16 is schematically illustrated in FIG. 3. The normally open switch 54 in FIG. 3 may represent the door switches 34-37 or the hood switch 38 or the trunk switch 40 in the preferred embodiment. The moveable contact of the switch 54 is electrically connected to ground. The normally open contact 56 of the switch is electrically connected through a resistor 58 to the battery 46 to one input 60 of a flip flop comprising a pair of cross-coupled NOR gates 62 and 63, and also to the input of an inverter 64. Electrically connected to one input 66 of the NOR gate 63 is a connection from the arming means 12 which is enabling when the system is armed. The outputs of the NOR gate 63 and the inverter are electrically connected at the input to the NAND gate 68.

In the preferred embodiment the logic levels of the electrical signals of the electronic security alarm system are such that a true signal is an electrical voltage approximating the battery potential and a false signal is an electrical voltage approximating ground potential. Thus, in FIG. 3 when the switch 54 is normally open, the signal at the normally open contact 56 is a true signal and the voltage is approximately B+. In a similar manner the ARM signal 70 is true when the system is disarmed and false when the system is armed. The logic of the NOR gate is that a true signal on the input will generate a false output and likewise the logic of the NAND gate is that a false signal on the input will generate as true signal on the output.

FIG. 4 is a signal chart of the sequence circuit of FIG. 3. The first column in FIG. 4 states the conditions of the switch 54 and the arm signal 70. The normal conditions are with the switch 54 open and the system disarmed. Of particular importance are the sequence lines 72-76 which define a sequence of operations particularly pertaining to the sequence control of the present invention. Sequence line 72 indicates the input conditions to the circuit of FIG. 3 are normal, that is the switch is open indicating all the doors are closed and the system is not armed. Line 73 indicates the condition when the driver and one or more passengers open their doors, or the hood or trunk is open with the system disarmed. It is seen that the output of the NAND gate 68 in this condition is the same as the output of the NAND gate in the normal position, namely, a true signal. Line 74 indicates the driver closing his door and arming the system with one or more of the other doors still open. The output of the NAND gate 68 remains true. Line 75 indicates that all the doors are closed and the system is armed and therefore, the output of the NAND gate 68 remains true. At this time, this indicates the system is armed and there is no violation. Line 76 indicates that one of the doors is open, a violation, and therefore, the output of the NAND gate 68 is false. Thus, when the sequence control circuit of FIG. 3 is incorporated in the overall system schematic of FIG. 5, the electronic security alarm system may be armed while one of the compartment doors remains open and the system will not indicate a violation due to that compartment door being open until that particular door is subsequently closed and then reopened. However, the system will indicate a violation if after the system is armed one of the other doors is then opened. Thus, one of the principal objects of the invention is fulfilled inasmuch as the driver of the vehicle is permitted to arm the system without waiting until all the compartment doors are closed.

Referring to FIG. 5, there is illustrated a schematic of the electronic security alarm system of FIG. 1. The logic of FIG. 5 is all positive level logic, that is, true conditions are high voltage levels and false conditions are low or ground levels. The logic rules for each of the NOR gates are that any true or high signal on the input will result in a false or low signal on the output. Likewise, the logic rules for each of the NAND gates are that any false or low signal on the input will result in a true or a high signal on the output.

The schematic of FIG. 5 is further divided into the several blocks of FIG. 1 generally illustrating the electronic content of each of the blocks. The switch means 10 comprises the switches 34-37 representing the door switches, the hood switch 38 and the trunk switch 40 all electrically connected to ground as illustrated in FIG. 2. The normally open contact of each of these switches is connected through resistors 78-80 to the voltage of the battery B+.

The arming means 12 comprises the pair of arming switches 44-45 electrically connected in circuit to a pair of inverters 82 and 83 and a flip flop comprising a pair of cross-coupled NOR gates 84 and 85. The inverter 82 is electrically associated with the arming contact of the arming switch and the inverter 83 is electrically associated with the disarming contact of the arming switch. The normal output of each of the inverters 82 and 83 is a false or low signal inasmuch as the input is connected through resistors 86 and 87 to the battery thereby maintaining a true or high input signal to each of the inverters in the normal state. The normal output of the NOR gate 84 is a true or high signal and likewise the normal output of the NOR gate 85 is a false or low signal.

The sequence control 16 comprises three of the circuits illustrated in FIG. 3 which have been previously explained. For the purposes of discussion, the uppermost sequence control circuit of the sequence control unit 16 has like reference numbers as in the circuit of FIG. 3. The switch 54 of FIG. 3 is replaced by the hood switch 38 in FIG. 3 and likewise the resistor 58 of FIG. 3 corresponds to the resistor 78 in FIG. 5. Thus, as in FIG. 3 as explained by the signal table of FIG. 4, the normal output of the NAND gate 68 is true or high level except when the system is armed and the hood switch is closed indicating that the hood is open.

Other than the entrances to the hood, passenger and trunk compartments which are monitored, the security alarm system is responsive to the distress switch 22 and the ignition switch 24. As illustrated by the NAND gate 88 whenever the system is armed and the ignition switch is operated, the output of the NAND gate 88 will switch from its normally true or high output to a flase or low output.

The logical outputs from each of the compartment sequence switches, the ignition NAND gate 88 and the distress switch 22 are collected at the input leads of a five input NAND gate 90. In the normal condition each of the inputs to the NAND gate 90 are true and the output is false. However, when any of the switches are activated under arming conditions their corresponding input to the NAND gate 90 will switch to a false level and the output will switch to a true level.

The locking means 20 comprises two NAND gates 92 and 93 and three solenoid driver circuits 94, 95 and 96. The solenoid driver circuit 94 supplies the power to the door lock relay 26 controlling the solenoids in each of the doors to the passenger compartment. The solenoid driver circuit 95 supplies power to the locking coil 48 to lock the hood in a closed position, and conversely, the solenoid driver 96 supplies power to the unlock coil 49 to unlock the hood. Each of the solenoid drivers 95 and 96 have timed output signals for supplying power to the solenoids for a predetermined period of time sufficient to activate the solenoid after which time the power is removed. The solenoid driver 94 to the door lock relay 26, in a similar manner, cooperates with the solenoids to supply power to the solenoids for a predetermined period of time sufficient to cause the doors to be locked.

The NAND gate 92 is responsive to the output from the inverter 82 and to the output of the NOR gate 63 of the sequence control circuit for the hood switch 38. As shown in FIG. 4, the normal output of the NOR gate 63 is false except when the system is armed at which time the output is true. The output from the inverter 82 is true only during the actual time of arming of the system. With both true outputs, the output of the NAND gate is low which causes the output of the second NAND gate 93 to go high and thereby activate the solenoid drivers 94 and 95. Likewise, when the distress button 22 is depressed, the other input to the NAND gate 93 is switched from high to low generating a high output from the NAND gate 93 energizing the solenoid drivers 94 and 95 to lock the hood and the doors of the vehicle.

As illustrated in FIG. 5, the control means comprises the NAND gates 88 and 90, a flip flop comprising a pair of cross-coupled NOR gates 97 and 98 and a driver amplifier 99. The driver amplifier when activated functions to energize the relay controlling the power to the alarm means such as the headlights 50, 51, the taillights 52, 53, the sidelights, and the horn 32. The output of the NAND gate 90 is supplied to one input of the NOR gate 97 and to the timing means 18, and conversely, the output of the NOR gate 98 is false.

Whenever the system is armed and violated, as indicated by a true signal at the output of NAND gate 90, the output of the NOR gate 97 switches from a true signal to a false signal. When the system is disarmed by action of either arming switch 44-45, the output of the inverter 83 goes true causing the output of the NOR gate 98 to switch to a false signal. Thus, the function of the flip flop comprising gates 97 and 98 is to remember when the system is armed and violated.

The timing means 18 in the preferred embodiment comprises a counter 100, a NOR gate 102 and a multivibrator 104. The function of the multivibrator is to generate the timing signals for pulsing the lights and the horn, and supplying the triggering signals to the counter 100. In the preferred embodiment, the timing rate of the multivibrator is approximately 100 cycles per minute and the counter is such that an output is supplied to the input 106 of the NOR gate 102 3 minutes after the counter begins. The signal on the input 106 of the NOR gate 102 is normally true except when the counter is counting and the signal is false. At the end of the predetermined time the signal again goes true. The other input 108 to the NOR gate 102 from the NOR gate 97 is normally in a true condition except when there is a violation and therefore the input switches to a false signal. With both inputs false to the NOR gate 102, the output switches from a false to a true signal activating the multivibrator.

The counter is reset by a true signal from the NAND gate 90 indicating a violation and begins to count when the signal from the NAND gate goes false indicating the violation is corrected. A true signal at the input to the counter 100 from the NAND gate 90 resets the counter. After the violation is corrected, the NAND gate going false, the counter will count for a 3 minute time period, thus it is seen that once the system is armed and there is a violation, the alarm means will be activated for 3 minutes, or the full count of the counter, after the violation is corrected as indicated by a false output of the gate 90.

If an occupant of the vehicle actuates a distress signal 22, this being a mometary switch, the output of the NAND gate 90 will switch from a false to a true level for a period of time equal to the amount of time that the occupant is holding the switch down. Typically, this is a relatively short period of time, therefore, when the distress switch is depressed, the alarm indicating means, namely, the headlights, taillights, sidelights and horn will be pulsed for a period of time approximately equal to the length of the counter or approximately 3 minutes and will then be turned off. However, should the occupant hold the switch, the alarm will sound as stated above. The distress switch allows the occupant to instantly establish a condition of maximum security to the car and to activate the total alarm system. As illustrated in FIG. 5, at the time of depression of the distress switch 22, the door lock relay 26 and the hood lock coil 48 are immediately activated and the alarm system is energized. At the conclusion of the timing of the counter 100, the doors and the hood remain locked although the alarm is shut off.

The electric wiring associated with the logic of FIG. 5 in the preferred embodiment is incorporated within the major electrical harnesses of the motor vehicle. In this manner it is more difficult for an unauthorized individual to seek out and cut the wiring and thereby defeat the system.

There is thus shown and described an electronic security alarm system as adapted to a motor vehicle. In particular the alarm system provides sequencing control means responsive to the arming means and the indicated switch means for arming the system even though one of the switches indicate that the compartment doors are open.

What is claimed is:

1. In a motor vehicle having a hood member, a trunk member, a plurality of door members, exterior lights, a horn, and an electrical power supply, an electronic security alarm system comprising:
   a plurality of switch means each located at a corresponding one of said vehicle members, each said switch means being normally in a first position indicating that the corresponding member is in closed position and being actuable to a second position whenever the corresponding member is opened;
   arming means operatively associated with a key-actuated lock of the motor vehicle and responsive to the actuation of a key in the lock to provide an arming signal for arming the security alarm system;
   a plurality of locking means each associated with a corresponding one of said door members and of said hood member and responsive to said arming signal and to the first position of the corresponding switch means for locking the corresponding member in its closed position;
   control means operatively coupled with said arming means and all said switch means for providing a control signal, said control means comprising first control circuit means for providing said control signal in response to said arming signal and to actuation of the switch means associated with the hood member from its first to its second position, second control circuit means for providing said control signal in response to said arming signal and to actuation of the switch means associated with the trunk member from its first to its second position, and third control circuit means for providing said control signal in response to said arming signal and to actuation of any one of the switch means associated with the door members from its first to its second position provided that all said door member switch means have been previously actuated to their respective first positions;
   timing means responsive to said control signal and electrically connected to the exterior lights and the horn for pulsing the exterior lights and horn with electrical power from the electrical power supply in response to said control signal; and
   a distress switch operatively coupled with said locking means and said control means, said distress switch being located within said vehicle and actuable by an occupant of the vehicle to actuate both said locking means and said control means independently of said arming means and of all said switch means whereby to prevent unauthorized entry into the vehicle and to pulse the exterior lights and the horn.

2. In a motor vehicle having a hood member, a trunk member, a plurality of door members, exterior lights, a horn, and an electrical power supply, an electronic security alarm system comprising:
   a plurality of door switch means each located at a corresponding one of the door members, each door switch means operating to a first condition when the corresponding door member is closed and operating to a second condition when the corresponding door member is open;
   hood switch means located at the hood member, said hood switch means operating to a first condition when the hood member is closed and to a second condition when the hood member is open;
   trunk switch means located at the trunk member, said trunk switch means operating to a first condition when the trunk member is closed and to a second condition when the trunk member is open;
   arming means operatively associated with a key actuated lock of the motor vehicle and responsive to the actuation of a key in the lock to provide an arming signal for arming the security alarm system;
   a plurality of locking means each associated with a corresponding one of said door members and of said hood member and responsive to said arming signal and to the first condition of the associated switch means for locking the corresponding member in its closed position;
   a plurality of sequence control means including a hood sequence control circuit, a trunk sequence control circuit and a door sequence control circuit;
   said trunk sequence control circuit comprising means operatively coupled with said trunk switch means and said arming means to provide a trunk alarm signal in response to said arming signal and actuation of said trunk switch means from its first to its second condition;
   said hood sequence control circuit comprising means operatively coupled with said hood switch means and said arming means to provide a hood alarm signal in response to said arming signal and the actuation of said hood switch means from its first to its second condition;
   said door sequence control circuit comprising means operatively coupling each of said door switch means in shunt with each other as a single input to said door sequence control circuit, means coupling said arming means as another input to said door sequence control circuit and means responsive to said door switch means and to said arming means to provide a door alarm signal in response to said arming signal and to actuation of any one of said door switch means from its first to its second condition provided that all said door switch means have been previously actuated to their respective first conditions; and timing circuit means operatively coupled with said sequence control means for pulsing the exterior lights and the horn with electrical power from the electrical power supply when any one of the said alarm signals is given.

* * * * *